Dec. 3, 1957 M. M. ADAMS 2,815,014
INTERNAL COMBUSTION ENGINE AND PISTON THEREFOR
Filed Dec. 9, 1954 4 Sheets-Sheet 1

INVENTOR.
M.M. ADAMS
BY *Hudson & Young*
ATTORNEYS

Dec. 3, 1957  M. M. ADAMS  2,815,014
INTERNAL COMBUSTION ENGINE AND PISTON THEREFOR
Filed Dec. 9, 1954  4 Sheets-Sheet 3

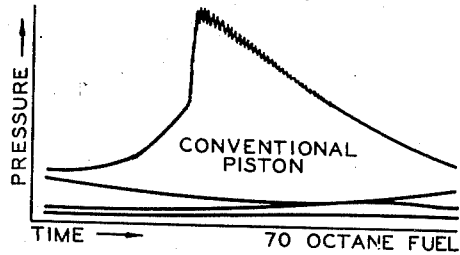

FIG. 9 — CONVENTIONAL PISTON — 70 OCTANE FUEL

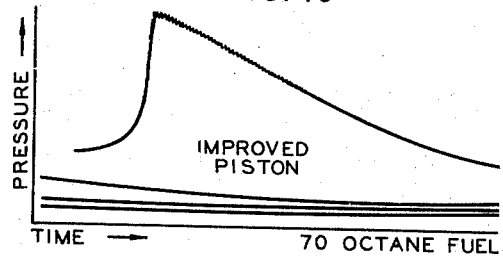

FIG. 10 — IMPROVED PISTON — 70 OCTANE FUEL

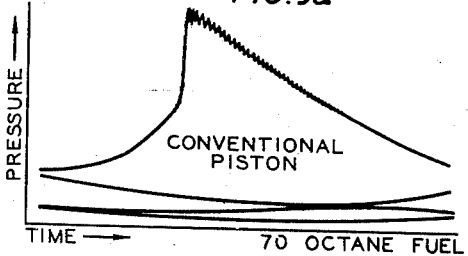

FIG. 9a — CONVENTIONAL PISTON — 70 OCTANE FUEL

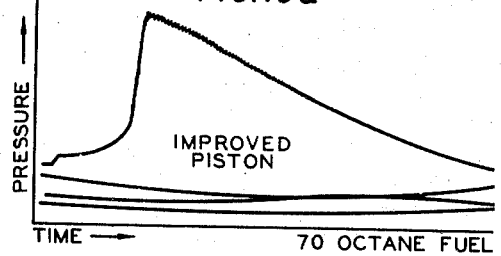

FIG. 10a — IMPROVED PISTON — 70 OCTANE FUEL

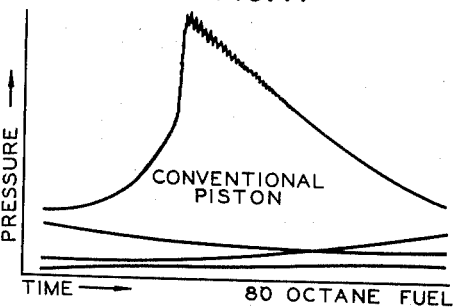

FIG. 11 — CONVENTIONAL PISTON — 80 OCTANE FUEL

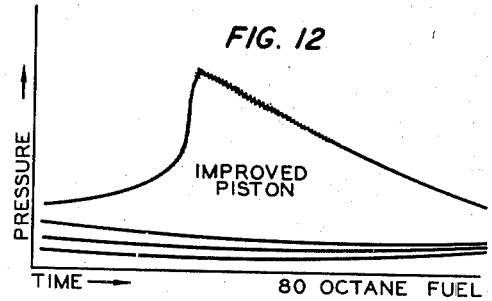

FIG. 12 — IMPROVED PISTON — 80 OCTANE FUEL

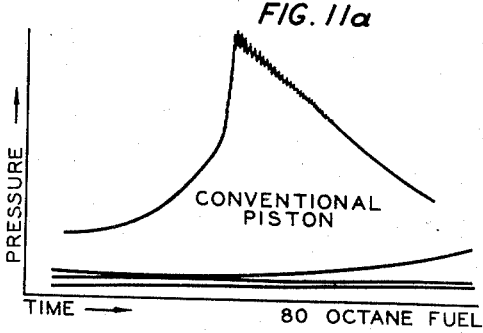

FIG. 11a — CONVENTIONAL PISTON — 80 OCTANE FUEL

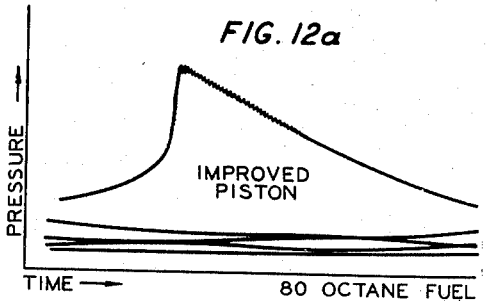

FIG. 12a — IMPROVED PISTON — 80 OCTANE FUEL

INVENTOR.
M. M. ADAMS
BY
ATTORNEYS

Dec. 3, 1957  M. M. ADAMS  2,815,014
INTERNAL COMBUSTION ENGINE AND PISTON THEREFOR
Filed Dec. 9, 1954  4 Sheets-Sheet 4

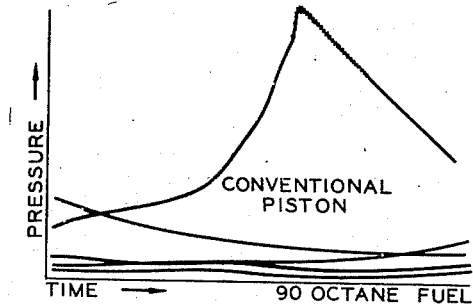

FIG. 13 — CONVENTIONAL PISTON — 90 OCTANE FUEL

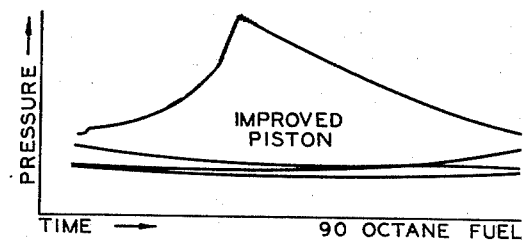

FIG. 14 — IMPROVED PISTON — 90 OCTANE FUEL

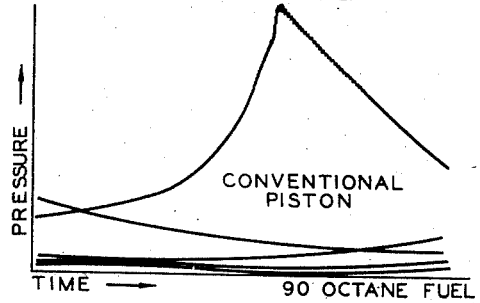

FIG. 13a — CONVENTIONAL PISTON — 90 OCTANE FUEL

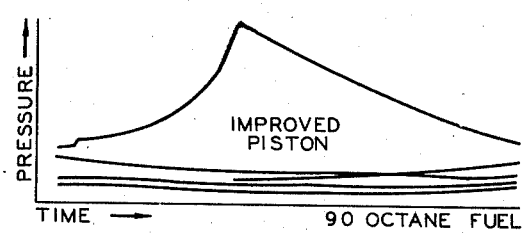

FIG. 14a — IMPROVED PISTON — 90 OCTANE FUEL

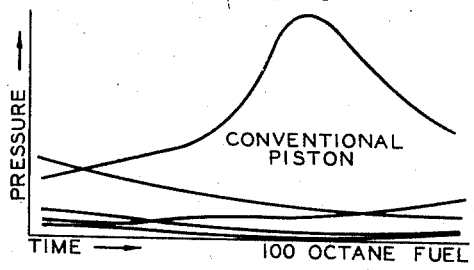

FIG. 15 — CONVENTIONAL PISTON — 100 OCTANE FUEL

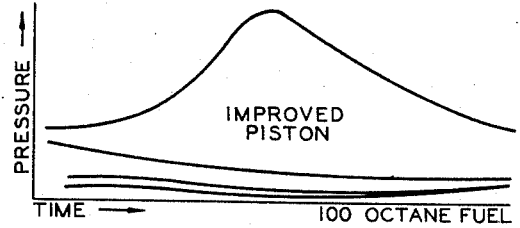

FIG. 16 — IMPROVED PISTON — 100 OCTANE FUEL

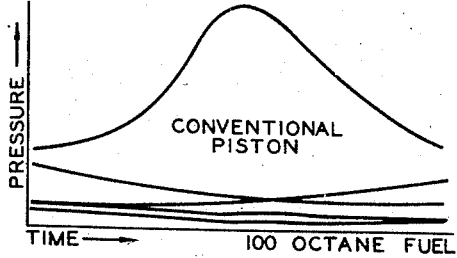

FIG. 15a — CONVENTIONAL PISTON — 100 OCTANE FUEL

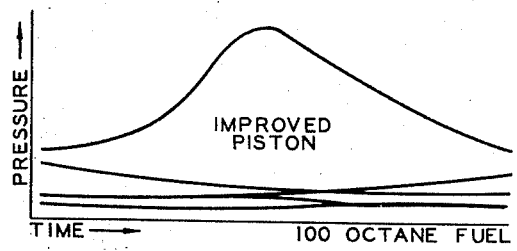

FIG. 16a — IMPROVED PISTON — 100 OCTANE FUEL

INVENTOR.
M.M. ADAMS

BY *Hudson & Young*

ATTORNEYS

United States Patent Office 2,815,014
Patented Dec. 3, 1957

2,815,014

INTERNAL COMBUSTION ENGINE AND PISTON THEREFOR

Max M. Adams, Bartlesville, Okla., assignor to Phillips Petroleum Company, a corporation of Delaware Application December 9, 1954, Serial No. 474,073

6 Claims. (Cl. 123—191)

This invention relates to the reduction of detonation in internal combustion engines. In one aspect it relates to a means for minimizing auto ignition and resultant detonation in internal combustion engines. In another aspect it relates to means for minimizing auto ignition and resultant detonation in internal combustion engines to such an extent that a liquid hydrocarbon fuel of given anti-knock value appears to have a higher anti-knock value.

An object of my invention is to provide means for minimizing detonation in internal combustion engines.

Another object of my invention is to provide a relatively simple and inexpensive means for minimizing detonation in internal combustion engines.

Still another object of my invention is to provide a relatively inexpensive means for effectively increasing the apparent anti-knock value of hydrocarbon fuels for internal combustion engines.

Still other objects and advantages of my invention will be realized upon reading the following description which, taken with the attached drawing, forms a part of this specification.

I accomplish these and other objects and advantages by providing an internal combustion engine piston and cylinder assembly, the piston of which comprises a piston body, a plurality of grooves in the head of said piston, said grooves being substantially rectangular in cross section and of depth approximately one-fourth of the wave length of the fundamental standing acoustic wave it is desired to suppress. The width of the grooves can be ¼ wave length of said fundamental frequency but other widths can be used. This piston is herein termed a detonation suppressing piston and this detonation suppressing piston is operatively disposed in a cylinder of an internal combustion engine in such a manner that the top surface of the lands, to be hereinafter described, reach a distance from the head end of the cylinder equal to about twice the groove depth at the point of maximum $dp/dt$ (change of pressure per unit of change in time) within the chamber. This point varies from engine to engine but is usually 5–7 engine degrees after top dead center.

I have found that by making grooves of rectangular cross section in the head of a piston, and/or in the cylinder head, that the portion of a sound wave front, which enters the grooves and is reflected, becomes cancelled at the time it returns to the plane of entrance of the grooves by a wave front 180° behind the wave front which was reflected. To describe this phenomenon more clearly I will illustrate this reflection and wave cancellation graphically.

In the drawing,

Figures 7, 7a, 9, 9a, 11, 11a, 13, 13a, 15 and 15a are pressure diagrams taken from a cylinder of an internal combustion engine during combustion of fuel of various anti-knock values (octane numbers) when employing conventional pistons, that is, pistons having a plane, smooth face.

Figures 8, 8a, 10, 10a, 12, 12a, 14, 14a, 16 and 16a are pressure diagrams taken from an internal combustion engine cylinder during combustion of fuel of the same corresponding anti-knock values when the engine was fitted with a piston of my invention.

Figure 6:
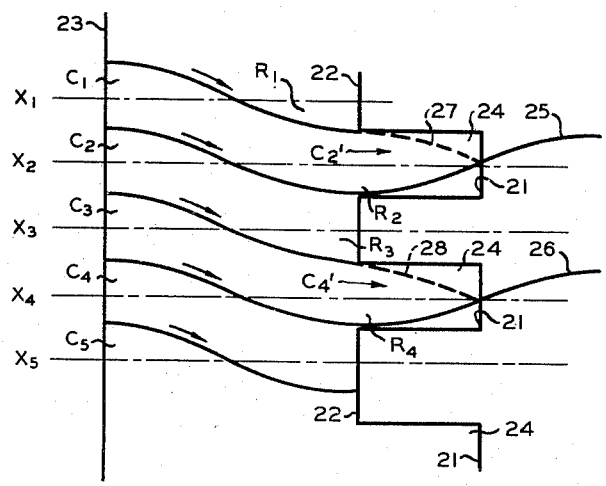
Figure 6 illustrates in graphic form the cancellation of a fundamental acoustic wave by my piston.

Figure 6 is intended to illustrate the basic idea upon which my invention is based. In this figure reference numeral 23 identifies a plane surface from which an acoustic wave is assumed to be reflected. Reference numeral 22 identifies a plane surface into which grooves 24 are cut. Reference numeral 21 identifies the bottom surfaces of the grooves 24. The grooves 24 are rectangular in cross section and are about half as deep as the distance between the plane surface 23 and the plane surface 22. It is well known that sound waves can be illustrated by sine curves and in Figure 6 I have drawn several sine curves along axes $X_1$, $X_2$, $X_3$, $X_4$ and $X_5$. Sound waves are believed to be composed of at least in part two main portions, one of which is referred to as the "compression" and the other is termed the "rarefaction." In this figure the area under the curve and above the axis $X_1$ and identified by $C_1$ is herein considered a compression. The area above the curve and below the axis $X_1$ is herein considered the rarefaction portion and is identified by $R_1$. In the transmission of sound waves in a gas, as for example, in air, the portion of such a curve identified by $C_1$ is at a pressure higher than the ambient pressure while the pressure represented by the rarefaction $R_1$ is lower than the ambient pressure. As the sound wave continues it is made up of alterations of high pressure portions and low pressure portions. According to my invention, I provide grooves 24 in the surface of, for example, a piston, and these grooves are constructed to have a depth of approximately one-fourth the wave length of the sound wave which is to be suppressed. Upon consideration of the portion of the wave along the $X_2$ axis the rarefaction portion $R_2$ extends into the groove 24. Dotted wave portions 27 and 28, are shown in the grooves 24 and these dotted wave portions are illustrated as having been reflected by surfaces 21. To explain reflection of the sound waves the sine curves drawn along the $X_2$ and the $X_4$ axes are drawn some little distance to the right and beyond the bottom surface 21 of the grooves and these extended curves are identified by reference numerals 25 and 26. The wave would follow this path if the groove bottom surfaces were not present. But since the groove bottom surfaces 21 are actually present these curves as representing sound wave travelling from left to right and at the surfaces 21 are reflected to the left and in being so reflected follows the path of the dotted lines 27 and 28. On reference to reflection 27 the portion $C_2'$ between the dotted curve 27 and the axis $X_2$ is a compression and the maximum compression reaches the plane 22 at the very same time that a maximum rarefaction $R_2$ reaches this plane. $C_2'$ is a compression (reflected) and $R_2$ is a rarefaction (direct wave) and when these two opposite components of the wave approach or reach the plane 22 they cancel each other with the result that wave reflections do not leave the plane surface 22 to travel in the direction of the reflecting surface 23.

Furthermore, upon consideration of the sine curves drawn along the axes $X_2$ and $X_1$ the reflected compression $C_2'$, just mentioned, reaches the plane surface 22 at the same time that the maximum rarefaction $R_1$ reaches surface 22 and the rarefaction $R_1$ tends to cancel the reflected compression $C_2'$. Thus, the rarefaction $R_1$ and also the rarefaction $R_2$ act in unison to cancel the reflected compression $C_2'$. In like manner the rarefactions $R_3$ and $R_4$ tend to cancel the reflected compression $C_4'$. Thus, it is seen that when the grooves 24 are one-fourth wave length in depth that a reflected compression cancels the adjacent rarefactions with the result that sound waves reflecting from the surface 23 are absorbed along the surface 22 with the result that there is no sound build-up by reflection intermediate these two surfaces.

According to my invention, in one embodiment, surface 23 is the inner surface of a cylinder head of an internal combustion engine while the surface 22 is the face of a piston into which are made grooves 24. As mentioned above, grooves 24 have a depth of one-fourth the wavelength of the acoustic wave it is desired to suppress while the distance between the cylinder head 23 and the piston face 22 is about twice the groove depth at the point of maximum $dp/dt$ (change of pressure per unit change in time) within the cylinder. This point varies from engine to engine but is usually 5–7 engine degrees beyond top dead center. The width of grooves 24 is illustrated in Figure 6 as being about ½ their depth, but the width can be equal to their depth, i. e., ¼ wavelength, if desired.

Figure 2:
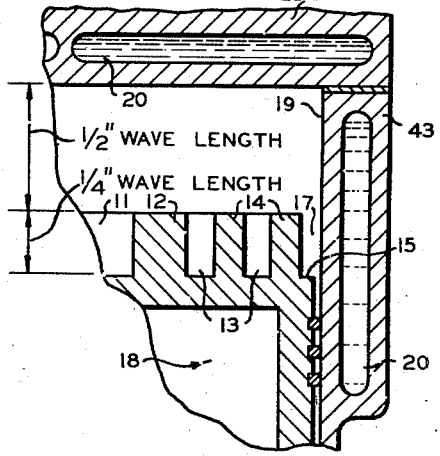
Figure 2 is an elevational view, in section, of a portion of an internal combustion engine cylinder and piston made according to my invention.

Figure 2 of the drawing illustrates in diagrammatic form, an elevational view, partly in section, of a portion of a cylinder and piston, the piston containing grooves for sound suppression. In this figure reference numeral 19 identifies the cylinder side wall and reference numeral 29a identifies the cylinder head. The cylinder wall 19 is provided with a jacket 43 to make provision for a coolant 20. This cylinder is fitted with a piston 18, the face of which is provided with grooves 11, 13, and 17, the bottom of groove 17 being identified by reference numeral 15. The portion of the piston face not grooved in this figure is identified by reference numerals 12 and 14 and these ungrooved portions are herein termed lands. In the embodiment illustrated in Figure 2 the depth of the grooves is intended to be one-fourth wavelength of the sound it is desired to suppress and the distance between the lands 12 and 14 and the inner face of the cylinder head is hereinbefore disclosed.

Figure 3:
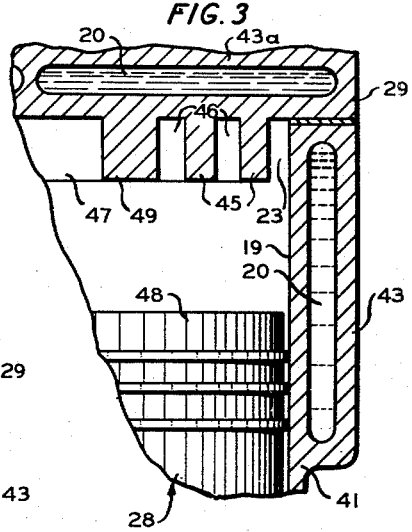
Figure 3 is an elevational view, partly in section, of another embodiment of my invention.

In Figure 3 of the drawing is illustrated another embodiment of my invention in which the surface of the cylinder head 29 is grooved in place of the face of the piston. Thus, in this figure cylinder 19 is provided with jackets 43 and 43a for enclosing spaces for a cooling agent 20. Within the cylinder proper grooves 46 and 47 are cut in the cylinder head leaving lands 45 and 49 in a manner similar to that described above relative to the piston of Figure 2. This cylinder is provided with a piston 48 having a smooth, plane face. The depth of the grooves 46 and 47 is one-fourth wavelength of the sound it is desired to suppress and the distance between the land surfaces 45 and 49, and the face of the piston 48 is the same as stated above relative to the distance between the land sufaces of Figure 2 and the cylinder head. The mechanism involved in the suppression of the acoustic wave in the embodiment illustrated in Figure 2 is the same irrespective of whether the grooves are cut in the face of the piston or in the head of the cylinder.

Figure 4:
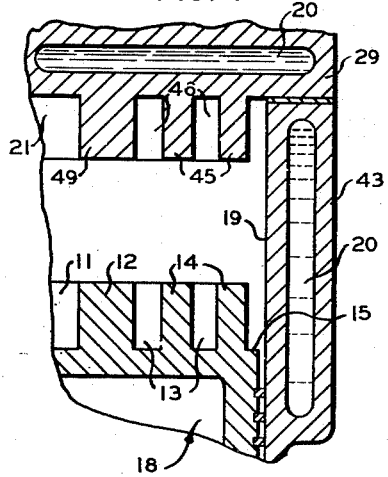
Figure 4 is an elevation view illustrating still another embodiment of my invention.

In still another embodiment of my invention, which is illustrated in Figure 4, grooves are cut in the face of the piston and in the cylinder head. In this figure reference numeral 19 identifies the cylinder wall, a portion of which is enclosed by jacket 43 thereby providing a space for a coolant 20. In the face of piston 18 are cut grooves 13 and 11 which are one-fourth wavelength in depth. Grooves 46 are cut into the head of the cylinder 29, similar to those of Figure 3, leaving land surfaces 45 and 49. The land surfaces 45 and 49 in the cylinder head 29 are intended to be separated from the land surfaces 12 and 14 of the piston by the distance hereinbefore disclosed relative to the cylinder head and lands of the piston in Figure 2.

In each of the above disclosed embodiments the area of the grooves in a piston, and in a cylinder head, is intended to be equal to the ungrooved area or area of the lands.

Figure 5:
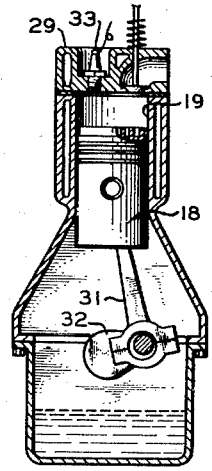
Figure 5 illustrates, diagrammatically, an internal combustion engine provided with the piston of my invention.

In Figure 5 is illustrated, in diagrammatic form, piston 18 of my invention disposed in a cylinder 19. The piston is attached operatively by a connecting rod 31 to a crank 32. An engine of this type operates the same as any other internal combustion engine in that combustion of a combustible mixture of vaporous fuel and air in the combustion chamber intermediate the cylinder head and face of the piston exerts pressure against the face of the piston and pushes same downward to rotate the crank.

Figure 7:
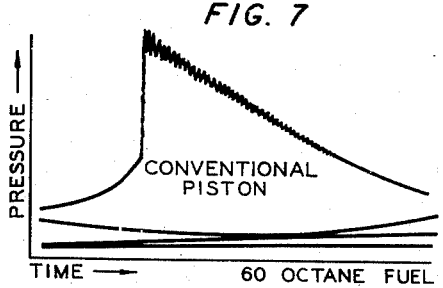
Figure 8:
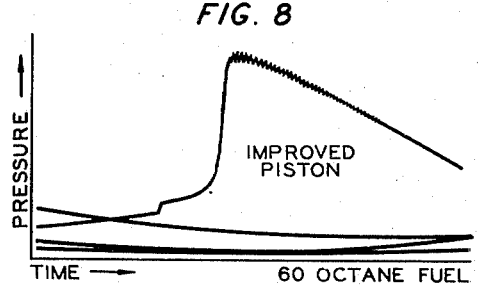
Figure 7A:
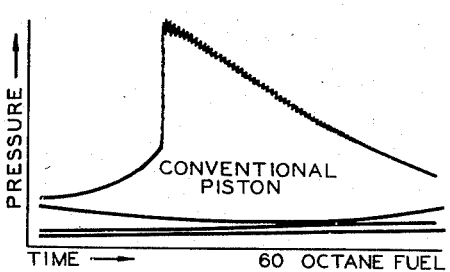
Figure 8A:
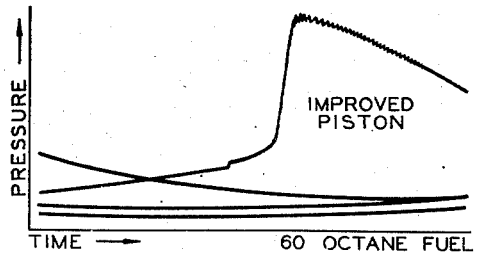

In Figures 7 and 7a are illustrated pressure diagrams showing pressures within an internal combustion engine cylinder operating on a 60 octane number gasoline with a conventional piston. By the term conventional piston, I mean one having a smooth, plane face. In Figures 8 and 8a are illustrated pressure diagrams showing the pressures in a cylinder of the same internal combustion engine when using a piston having grooves in its face made according to my invention. Upon carefully comparing the slope of the nearly vertical portions of these several pressure diagrams it is seen that the vertical portions shown in Figures 7 and 7a are considerably more nearly vertical than are the corresponding portions of the diagrams of Figures 8 and 8a. In other words, the $dp/dt$ i. e. the rate of change of pressure per unit of time in the diagrams of Figures 7 and 7a are greater than the $dp/dt$ for the diagrams shown in Figures 8 and 8a. Thus, in the diagrams of Figures 7 and 7a the increase of pressure in the combustion chamber per unit of time immediately prior to peak pressure is considerably greater than the increase in pressure per unit of time following ignition when using the piston of my invention. The greater the slope of this portion of the curve the greater is the detonation or knock. Since it is desirable to minimize knocking, a piston which gives a diagram having less rapid pressure increase per unit of time as described above tends to suppress knocking intensity. When this same engine was fitted with a piston of my invention, a liquid fuel having an octane number of 80 gave the same knock intensity as was given by the 87 octane number fuel with the standard piston. Thus, according to these data, an engine equipped with my piston can operate on lower octane fuels.

Another series of runs was made in which standard pistons and pistons made according to my invention were used. In this series of runs pistons made according to my invention gave a certain knock intensity when the engine was powered with a 70 octane fuel and when the same engine was fitted with standard pistons an 86 octane number fuel was required to provide the same knock intensity. Thus, it is seen that considerably higher octane fuels are required for obtaining a certain engine equivalent detonation when using a standard piston than when using the piston of my invention.

It will be noticed that the oscillations, evident at the peak pressure, are of much greater magnitude where the conventional piston was used than in the corresponding case where my improved piston was used. Close examination of photographs of oscilloscope traces, from which drawings 7, 7a, 8, 8a . . . were made, indicate these oscillations were present throughout the region of rapid rise in pressure where the conventional piston was used. No evidence of oscillations during the corresponding time (of rapid pressure rise) using the improved piston were visible. Thus it appears that my grooved piston effectively suppresses sound reflections.

Figure 1:
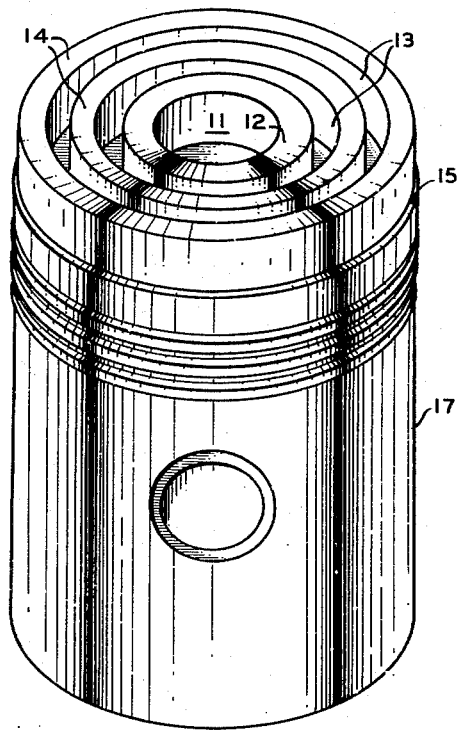
Figure 1 is a perspective of the piston of my invention.

In Figure 1 is illustrated a piston 17 having its face so machined as to provide grooves 11, 13 and 15 and lands 12 and 14. In one case I made such a piston with grooves having a depth of 0.315 inch. Such a groove depth suppresses acoustic reflections of 1.260 inch wave length (0.315 inch being one fourth of 1.260 inch). This acoustic wave length appeared to be the wave length which accelerated autoignition in the engine in which I used conventional pistons and my improved piston. The grooves in my piston were 0.315 inch deep, as stated, and were about 0.25 inch wide, excepting the outer and inner grooves which were made of such width as to balance the area division equally between grooves and lands. The width of the grooves are under some conditions, one fourth wave length of the wave it is desired to suppress. Limiting factors on groove width would be the maximum width at which cancellation of the desired acoustic wave is effective and the minimum at which the lands are a source of radiant energy for promoting pre-ignition. While in one case a grooved piston was made with 0.315 inch deep grooves of 0.2 inch width, the outer groove being 0.1 inch wide and the inner groove (center of the piston face), reference numeral 11 of Figure 1, having a radius of 0.429 inch, to make the area of the lands equal to the area of the grooves. The outer lands 13 were 0.2 inch wide and the inner land was 0.284 inch wide. The groove depth was 0.315 inch for suppression of an acoustic wave of 1.260 inch wave length.

In other cylinders and under other conditions acoustic waves responsible for pre-ignition are usually of other wave lengths, thus the groove depth in the piston will vary accordingly.

While certain embodiments of the invention have been described for illustrative purposes, the invention obviously is not limited thereto.

I claim:

1. An internal combustion engine piston for suppressing a fundamental standing acoustic wave in the combustion chamber of a cylinder of an operating internal combustion engine comprising a cylindrical piston body having a piston head, a plurality of circular, concentric grooves in the outer surface of said piston head, said grooves being substantially rectangular in cross section, the area of the grooves being about equal to the area of the ungrooved portion of said piston head and the depth of the grooves being approximately one-fourth the wave length of said acoustic wave.

2. An internal combustion engine piston for suppressing a fundamental standing acoustic wave in the combustion chamber of a cylinder of an operating internal combustion engine comprising a cylindrical piston body having a piston head, a plurality of circular concentric grooves in the outer surface of said piston head, said grooves being substantially rectangular in cross section, and the depth of said grooves being approximately one-fourth the wave length of said acoustic wave.

3. An apparatus for suppressing a fundamental acoustic wave accompanying detonation in a combustion chamber of a cylinder of an operating internal combustion engine, said cylinder having a cylinder head and a piston operatively disposed therein, said piston having a piston face on the end facing said cylinder head, said chamber being defined by the walls of said cylinder, said cylinder head and said piston face, and said wave being one which once generated travels from said piston face to said cylinder head and back to said piston face by successive reflections, comprising, in combination, a plurality of concentric grooves in one of said cylinder head and said piston face, said grooves being substantially rectangular in cross section and of a depth approximately equal to one-fourth the wave length of said acoustic wave in said combustion chamber at the time of the maximum rate of change of pressure in said combustion chamber.

4. In the apparatus of claim 3 wherein the area of the grooves is about equal to the ungrooved portion of the piston face.

5. In the apparatus of claim 3 wherein said grooves are disposed in said cylinder head.

6. In the apparatus of claim 3 wherein said grooves are disposed in said piston face.

References Cited in the file of this patent

UNITED STATES PATENTS

| | | |
|---|---|---|
| 788,057 | Morrison | Apr. 25, 1905 |
| 2,157,764 | Langrognet | May 9, 1939 |
| 2,573,536 | Bodine | Oct. 30, 1951 |